US011182439B2

(12) United States Patent
Watanabe

(10) Patent No.: US 11,182,439 B2
(45) Date of Patent: Nov. 23, 2021

(54) AUTOMATIC DATA CAPTURE OF DESIRED DATA FIELDS AND GENERATION OF METADATA BASED ON CAPTURED DATA FIELDS

(71) Applicant: Kaoru Watanabe, Sunnyvale, CA (US)

(72) Inventor: Kaoru Watanabe, Sunnyvale, CA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/805,663

(22) Filed: Feb. 28, 2020

(65) Prior Publication Data

US 2021/0271716 A1    Sep. 2, 2021

(51) Int. Cl.
  *G06F 3/048*     (2013.01)
  *G06F 16/93*     (2019.01)
  *G06F 40/205*    (2020.01)
  *G06F 3/0486*    (2013.01)
  *G06F 3/0483*    (2013.01)

(52) U.S. Cl.
  CPC ............ *G06F 16/93* (2019.01); *G06F 3/0483* (2013.01); *G06F 3/0486* (2013.01); *G06F 40/205* (2020.01)

(58) Field of Classification Search
  None
  See application file for complete search history.

(56) References Cited

U.S. PATENT DOCUMENTS

| 8,392,472 | B1* | 3/2013 | Gupta | G06F 16/164 707/804 |
| 9,268,763 | B1* | 2/2016 | Esho | G06F 16/93 |
| 2005/0198563 | A1* | 9/2005 | Kristjansson | G06F 40/174 715/224 |
| 2006/0242180 | A1* | 10/2006 | Graf | G06F 16/86 |
| 2021/0271636 | A1 | 9/2021 | Watanabe | |

* cited by examiner

*Primary Examiner* — William C Trapanese
(74) *Attorney, Agent, or Firm* — Hickman Becker Bingham Ledesma LLP; Edward A. Becker

(57) ABSTRACT

An approach is provided for generating parsing rules that automatically identify attributes and attribute values from documents and generates metadata mapping information that is associated with electronic versions of documents processed. A graphical user interface (GUI) is displayed on a client device that contains a sample document containing field labels and field values, which represent attributes and attribute values. The GUI is configured to receive a first set of inputs identify field labels and field values. In response to receiving the first set of inputs, parsing rules are generated that define the relationships between the field labels and corresponding field values. A second set of inputs are received that include a selection of a subset of the parsing rules to generate metadata mapping that maps a subset of the field values to display labels. The metadata mapping is associated to a document library that manages views of the destination folder such that the parsing rules and the metadata mapping are applied to each document routed to the destination folder.

20 Claims, 7 Drawing Sheets

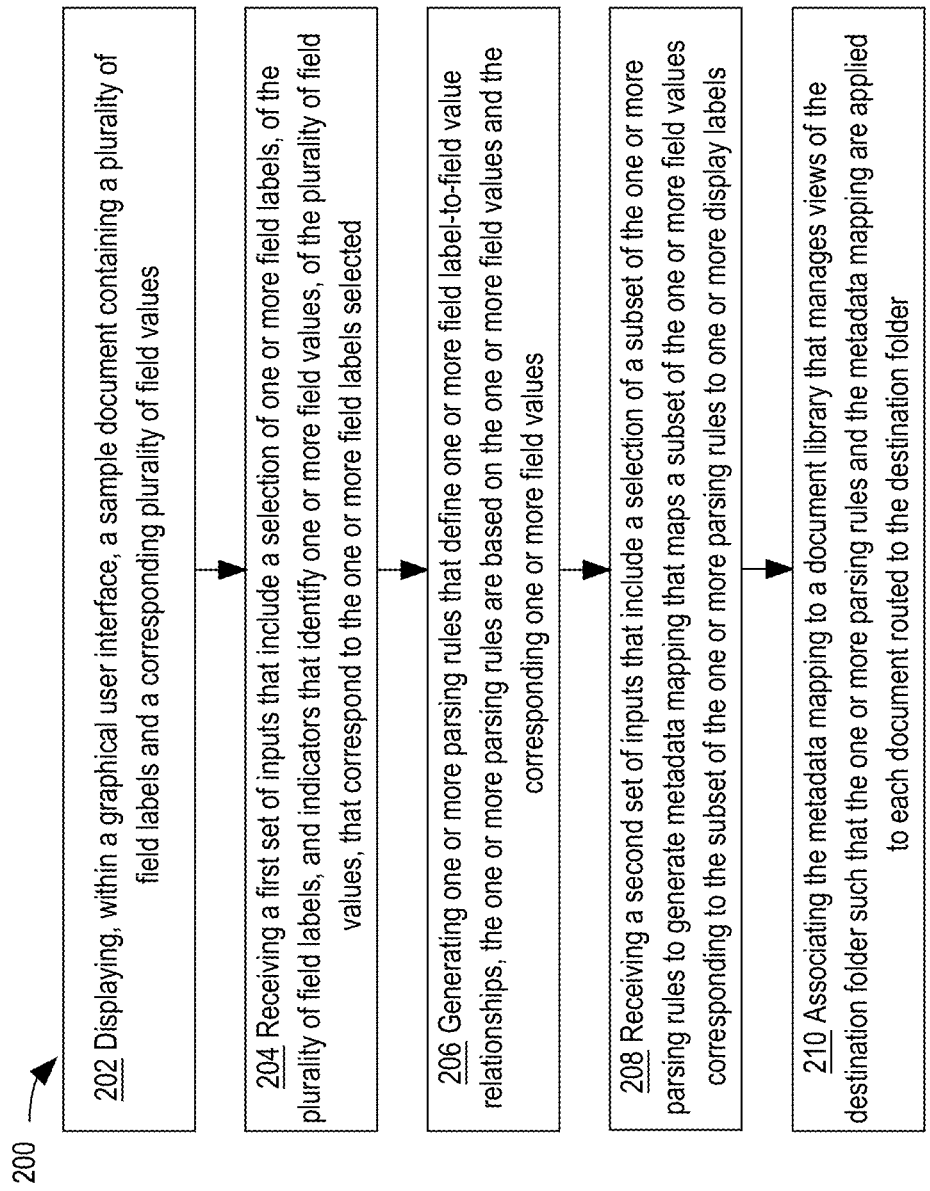

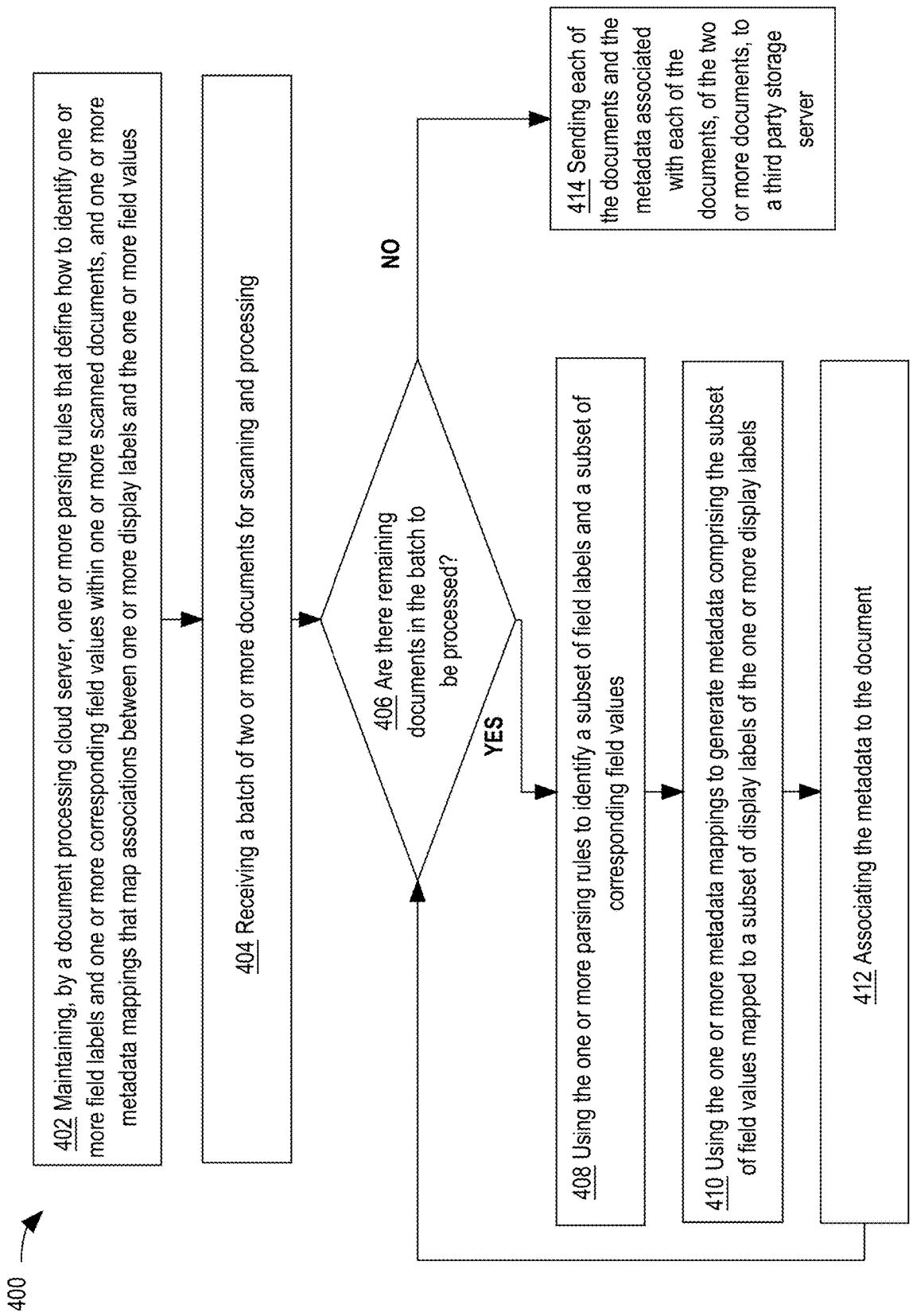

AUTOMATIC DATA CAPTURE OF DESIRED DATA FIELDS AND GENERATION OF METADATA BASED ON CAPTURED DATA FIELDS

RELATED APPLICATION DATA

This application is related to U.S. patent application Ser. No. 16/805,665, entitled "INTELLIGENT ROUTING BASED ON THE DATA EXTRACTION FROM THE DOCUMENT", filed Feb. 28, 2020, the contents all of which are incorporated by reference in their entirety for all purposes as if fully set forth herein.

FIELD OF THE INVENTION

This invention relates generally to processing electronic documents, and more specifically, to an approach for identifying attribute values within documents and routing the documents and their attribute values to an external storage location. SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The continued growth of network services, and in particular Internet-based services, provides access to an ever-increasing amount of functionality. Cloud services in particular continue to grow into new areas. One of the issues with cloud services is that they can be difficult to use with certain types of end-user devices, such as multi-function peripherals (MFPs) for several reasons. First, assuming that end-user devices have the requisite computing capability, some cloud services have interfaces that require a high level of programming skill and customization to implement on end-user devices. In addition, implementing a workflow that uses multiple cloud services requires an even higher level of skill and knowledge because each service has different settings requirements and the results of one cloud service have to be stored, reformatted, and provided to another cloud service. Further, some cloud services require that certain data, such as user authorization data, be maintained on the client side, e.g., at an MFP, which is unpractical and, in some situations, not possible.

SUMMARY

According to an embodiment, an apparatus comprises one or more processors, and one or more memories, communicatively coupled to the one or more processors, storing instructions. Processing of the instructions by the one or more processors causes displaying, within a graphical user interface of a client device, a sample document containing a plurality of field labels and corresponding field values. The sample document represents a particular type of document that is to be scanned and electronically stored within a destination folder. The plurality of field labels and field values represent attributes and attribute values of the sample document that are used to identify and route the document to the correct destination folder. The graphical user interface displayed on the client device is configured to receive a first set of inputs that include a selection of one or more field labels from the plurality of field labels and indicators that identify one or more field values that correspond to the one or more field labels selected. In response to receiving the first set of inputs, one or more parsing rules are generated, which define the relationships between the one or more field labels and the corresponding one or more field values. A second set of inputs are received that include a selection of a subset of the one or more parsing rules to generate metadata mapping that maps a subset of the one or more field values to one or more display labels. The one or more display labels may represent labels displayed, within an external graphical user interface provided by an external file storage service. The one or more processors of the apparatus associate the metadata mapping to a document library that manages views of the destination folder such that the one or more parsing rules and the metadata mapping are applied to each document routed to the destination folder.

According to another embodiment, an apparatus comprises one or more processors, and one or more memories, communicatively coupled to the one or more processors, storing instructions. Processing of the instructions by the one or more processors causes routing and storage of scanned documents on an external file storage service. Each of the scanned documents are stored with metadata that specifies one or more field values identified within the scanned documents and are used to sort, filter, and search against. A document processing cloud system maintains one or more parsing rules that define how to identify one or more field labels and one or more corresponding field values within the scanned documents, and one or more metadata mappings that map associations between one or more display labels and the one or more field values. The document processing cloud system receives a batch of two or more scanned documents for processing. For each document in the batch of the two or more scanned documents, the document processing cloud system uses the one or more parsing rules to identify a subset of field labels and a subset of corresponding field values. The document processing cloud system uses the one or more metadata mappings to generate metadata that includes the subset of field values mapped to a subset of display labels. The document processing cloud system associates the metadata to the document and sends the scanned documents and the associated metadata to the external file storage service that is configured to process the associated metadata and display the subset of display labels and the subset of field values within a graphical user interface of the external file storage service.

Embodiments may be implemented by one or more non-transitory computer-readable media and/or one or more computer-implemented methods.

BRIEF DESCRIPTION OF THE DRAWINGS

In the figures of the accompanying drawings like reference numerals refer to similar elements.

FIG. 2 is a flow diagram that depicts an approach for generating parsing rules and metadata mapping rules for documents to be processed, according to an embodiment of the invention.

FIG. 4 is a flow diagram that depicts an approach for generating metadata and associating the generated metadata to scanned documents that are stored within a destination folder on a third party storage service, according to an embodiment of the invention.

DETAILED DESCRIPTION

Figure 1:
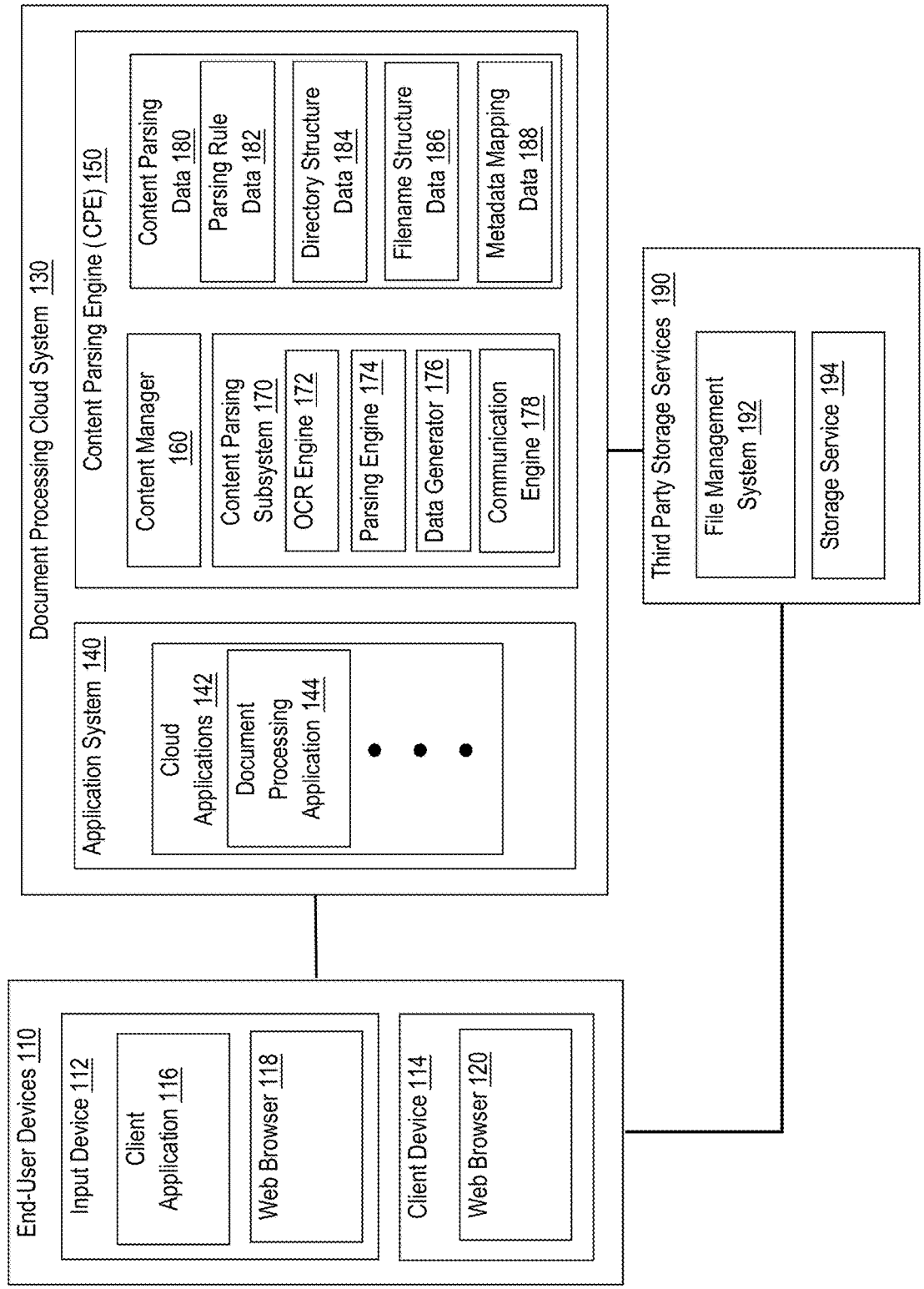
FIG. 1 depicts an example arrangement for accessing cloud services using end-user devices, according to an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE
III. PROCEDURAL OVERVIEW
   A. GENERATING PARSING AND ROUTING RULES
     1. RECEIVING A FIRST SET OF INPUTS
     2. GENERATING PARSING RULES
     3. RECEIVING A SECOND SET OF INPUTS
     4. ASSOCIATING THE METADATA MAPPING TO A DOCUMENT LIBRARY THAT MANAGES VIEWS OF THE DESTINATION FOLDER
   B. PROCESSING AND ROUTING SCANNED DOCUMENTS TO DESTINATION FOLDERS IN AN EXTERNAL STORAGE SERVICE
   C. THIRD PARTY STORAGE SERVICE
IV. IMPLEMENTATION MECHANISMS

I. Overview

An approach is provided for generating parsing rules to automatically identify attributes and attribute values from scanned documents and generating metadata mapping information to associate the attribute values as metadata to electronic versions of the scanned documents. The parsing rules define a set of attributes in scanned documents as field labels, where field labels represent a label or header of one or more field values. The attribute values refer to field values within a scanned document. The parsing rules define the associations between field labels and their corresponding field values based upon a relative location of the field value with respect to the field label. A graphical user interface for defining parsing rules and metadata mappings is provided to a client device. The graphical user interface receives a first set of inputs that identify field labels and their corresponding field values. In response to identifying the field labels and the corresponding field values, the graphical user interface causes a document processing cloud system to generate corresponding parsing rules based upon the relationships between field labels and the field values. A second set of inputs may be received by the graphical user interface that define metadata mappings that map display labels and field values defined in the generated parsing rules. The metadata mappings represent rules that associate specific field values to display labels that may be displayed within an external graphical user interface provided by an external storage service that stores electronic copies of the scanned documents. The external graphical user interface is configured to enable searching, filtering, sorting, and any other file display actions based upon the metadata mappings of field values extracted from the scanned documents.

This approach provides a technical solution to the technical problem of defining relationships between attribute values and display labels for different types of scanned documents. The technical solution provides an efficient graphical user interface that allows a user to input relationships between attribute values and display labels using an input action of selecting and dragging a parsing rule into an area designated for generating metadata mapping rules. This approach reduces the amount of computer processing used to configure metadata mapping associations to different electronic documents by allowing users to build several different parsing rules and metadata mapping rules using simple computer inputs.

An approach is provided for generating one or more metadata mappings for different electronic documents by applying one or more parsing rules and one or more metadata mappings to scanned documents. The document processing cloud system maintains parsing rules that define a relationships between field labels and corresponding field values and metadata mappings that define associations between field values and display labels. The document processing cloud system receives a batch of two or more documents that have been scanned by an input device. For each document in the batch, the document processing cloud system automatically determines a set of field values of interest using one or more defined parsing rules. The document processing cloud system generates metadata mapping that maps the selected field values to display labels on order to display the field values along with a representation of the electronic document within a folder view of an external graphical user interface. The generated metadata mappings are associated with the electronic document and are sent to an external storage service to storing. The external storage service provides the external graphical user interface that allows searching, filtering, sorting, and any other file display actions based upon the metadata mappings of field values extracted from the scanned documents.

This approach provides a technical solution to the technical problem of document searching and sorting of electronic documents based upon attribute values stored within the electronic documents. The technical solution provides a way to identify specific values within a document when only the format of the value is known. The field labels enable the document processing system to efficiently locate specific field values within a large document that contains many values without having to perform text recognition and analysis on each text character within the document. The generated parsing rules are used to define the metadata mappings that are to be associated with the electronic file. This approach reduces the computer processing resources needed to identify field values of interest by identifying specific field values based upon their relative location to a defined field label.

II. Architecture

FIG. 1 depicts an example arrangement for accessing cloud services using end-user devices. In an embodiment, arrangement 100 represents a network of computers. A "computer" may be one or more physical computers, virtual computers, and/or computing devices. A computer may be a client and/or a server. Any reference to "a computer" herein may mean one or more computers, unless expressly stated otherwise. Each of the modules/services described in FIG. 1 may comprise a set of one or more pages of main memory, such as RAM, in one or more computers into which executable instructions have been loaded and which when executed cause the arrangement 100 to perform the functions or operations that are described herein with reference to those modules. For example, the document processing application 144 may comprise a set of pages in RAM that contain instructions which when executed cause performing electronic document processing and document routing that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component within the arrangement 100 also may represent one or more files or projects of source code that are digitally stored in a mass storage device such as non-volatile RAM or disk storage, within one or more computers, which when compiled or interpreted cause generating executable instructions which when executed cause the arrangement 100 to perform the functions or operations that are described herein with reference to those modules. In other words, the drawing figure may represent the manner in which programmers or software developers organize and arrange source code for later compilation into an executable, or interpretation into bytecode or the equivalent, for execution by the arrangement 100.

In an embodiment, arrangement 100 includes end-user devices 110, document processing cloud system 130, and third party storage system 190. The approach is depicted in the context of processing and routing documents to destination folders within a third-party storage system. Processing may represent scanning of physical documents, identifying relevant attributes and attribute values, generating relevant metadata based on the identified attributes, and associating the metadata to a document object that is sent to the third party storage system 190 for storage. The third party storage system 190 may be enabled to analyze and display the associated metadata within a graphical user interface provided by the third party storage system. Display of the associated metadata may be used to filter, sort, and find specific documents based on their associated attributes.

End-user devices 110 include one or more input devices 112 and one or more client devices 114. In an embodiment, input device 112 represents a device that performs capturing of a document image, such as scanner device, a smart device, or any other computing device configured to capture images of a document. In an embodiment, client device 114 represents a device that may display a graphical user interface implemented to create, delete or edit parsing rules for parsing field labels and corresponding field values from a captured document image. The graphical user interface may be displayed within an application such as on a web browser. End-user devices 110 may include computer hardware, computer software, and any combination of computer hardware and computer software for performing capturing an image. This may include, for example, scanning components, one or more processors, one or more memories, one or more communications interfaces, such as wired and wireless interfaces, an operating system, one or more processes for supporting and performing the functionality provided by end-user devices 110, a display such as a touch screen display, etc. In an embodiment, end-user devices 110 include one or more elements for communicating with other processes. In the example depicted in FIG. 1, client device 114 may include a Web browser 120. Client application 116 represents an application that is configured to communicate with document processing cloud system 130 and implements at least a portion of one or more application program interfaces (APIs) of the document processing cloud system 130. For example, client application 116 may implement Web browser functionality to communicate with document processing cloud system 130. Web browser 118 and Web browser 120 may be any type of Web browser for communicating with document processing cloud system 130 and allows end-user devices 110 to access functionality provided by document processing cloud system 130.

Document processing cloud system 130 represents a network of server computers that make up a cloud server environment. The document processing cloud system 130 includes application system 140 and content parsing engine (CPE) 150. Document processing cloud system 130 may be implemented on one or more computing elements, such as network elements, servers, etc., and embodiments are not limited to any particular implementation for document processing cloud system 130. Document processing cloud system 130 may include fewer or additional elements than the elements depicted in FIG. 1, depending upon a particular implementation, and document processing cloud system 130 is not limited to any particular implementation. For example, document processing cloud system 130 may be implemented by one or more processes executing on one or more computing systems.

In an embodiment, document processing cloud system 130 includes cloud applications 142. Cloud applications 142 may be managed by one or more application server processes. Cloud applications 142 may include a wide variety of applications for performing various functions, including as connectors to services provided by CPE 150, as described in more detail hereinafter. As depicted in FIG. 1, cloud applications 142 include at least a document processing application 144. The document processing application 144 provides a user interface to a user of end-user devices 110 and access to the document processing application 144 in document processing cloud system 130.

In an embodiment, CPE 150 includes a content manager 160, a content parsing subsystem 170, and content parsing data 180. The components within CPE 150 may be implemented on one or more computing elements, such as network elements, servers, etc., and embodiments are not limited to any particular implementation for CPE 150. CPE 150 may include fewer or additional elements than the elements depicted in FIG. 1, depending upon a particular implementation, and CPE 150 is not limited to any particular implementation. For example, CPE 150 may be implemented by one or more processes executing on one or more computing systems.

In an embodiment, the content manager 160 implements processes to control processing of content parsing, processing of requests to and from the application system 140 and third party storage system 190, and controlling performance of various administrative tasks for the CPE 150. For example, the content manager 160 manages processes implemented to create, edit and delete parsing rule data 182.

The content parsing subsystem 170 includes one or more modules implemented perform various functions on content identified within the one or more documents processed by the CPE 150. In an embodiment, the content parsing subsystem 170 includes an optical character recognition (OCR) engine 172, a parsing engine 174, a data generator 176, and a communication engine 178. The OCR engine 172 represents one or more processes implemented to identify typed, handwritten, or printed text from a document and generate an electronic representation of the identified text. The parsing engine 174 represents one or more processes implemented to receive, as input, defined parsing rules for identifying field labels and corresponding field values within a document, and output one or more pairs of field label/field values. The data generator 176 represents one or more processes implemented to generate output data for sending to the third party storage system 190. For example, the data generator 176 may generate an image file representing the processed document, routing instructions that define where the image file is to be stored, and file naming instructions that define a naming convention for the generated image file, and metadata representing the one or more field label/field value pairs identified from the image file. The communication engine 178 represents one or more processes implemented to facilitate communication between the CPE 150 and the third party storage system 190. For example, the communication engine 178 may send the generated image file and the generated metadata to the third party storage system 190 for storing within a destination folder. Example modules described within the content parsing subsystem 170 are provided for explanation purposes and embodiments are not limited to these example modules. The content parsing subsystem 170 may implement more or less modules than is depicted in FIG. 1 to perform the specified functions.

Content parsing data 180 includes data used to configure and manage CPE 150. In an embodiment, the content parsing data 180 includes parsing rule data 182, directory structure data 184, filename structure data 186, and metadata mapping data 188. The parsing rule data 182 may represent the generated rules for parsing image data including rules to identify specific field label/field value pairs within image files. The directory structure data 184 may represent rules for generating a directory structure, within the third party storage system 190, for routing and storing generated image files within the third party storage system 190. The filename structure data 186 may represent rules for generating filenames for the generated image files based upon one or more field label/field value pairs specified by the one or more parsing rules. The metadata mapping data 188 may represent rules for mapping field values to third-party display labels and formatting the mapping into metadata objects to be associated with processed documents.

Third party storage system 190 may represent an external storage system configured to store data within a folder structure. In an embodiment, the third party storage system 190 include a file management system 192 and a storage service 194. The file management system 192 may maintain multiple different folder structures defined by one or more users of the third-party services 190. For example, a registered user may define a structure for one or more folders and subfolders for storing various files owned and/or accessible by the user. The file management system 192 may also implement one or more processes that generate a file storage graphical user interface configured to display the one or more files stored in the one or more folder and subfolders. In an embodiment, the storage service 194 may represent one or more processes implemented to process storage requests from the document processing cloud system 130, route and store received documents and/or metadata in their appropriate folder.

III. Procedural Overview

The following section describes embodiments for implementing parsing and routing rules for different types of documents and processing incoming documents, using the parsing and routing rules, and sending the generated output to the third party storage system 190.

A. Generating Parsing and Routing Rules

In an embodiment, the arrangement 100 may be used to generate parsing and routing rules for different types of documents received by an end-user device. For example, a user may have multiple sales invoices for multiple customers. The arrangement 100 may be used to define parsing and routing rules to parse data from the multiple sales invoices and route each of the sales invoices to different destination folders based upon the field values identified, from the invoices, using the parsing rules. For example, a set of sales invoices for multiple customers may be parsed and routed to different customer destination folders based upon their identified customer number.

FIG. 2 is a flow diagram that depicts an approach for generating parsing rules and metadata mapping rules for documents to be processed. Process 200 may be performed by a single program or multiple programs. The operations of the process as shown in FIG. 2 may be implemented using processor executable instructions that are stored in computer memory. For the purposes of clarity, process 200 is described in terms of a single entity.

At block 202, process 200 displays, within a graphical user interface, a sample document containing a plurality of field labels and a corresponding plurality of field values. In an embodiment, the document processing application 144 generates instructions to display the graphical user interface within web browser 120 of client device 114. The client device 114 may receive the instructions for generating the graphical user interface and the web browser 120 may render and display the graphical user interface on a display screen of the client device 114.

In an embodiment, the sample document may represent a template of the type of document to be processed, such as a template sales invoice or a template employee report. The template may contain samples of field labels and field values located in areas of the template document corresponding to where field labels and field values would be located within actual sales invoice documents and/or employee report documents. Field labels may represent a body of text, a symbol, or other mark within the document that is used to identify a field value. Field values represent attribute values that are of interest and may be used to determine routing and storing of processed documents. For example, an invoice number value may be a field value that may be used to identify different sales invoices from one another. The invoice number value may be preceded by text, a symbol, or other mark that identifies the field value as the invoice number. For instance, "Invoice number:" is an example of a body of text that is a field label used to identify a field value corresponding to the invoice number. The field value may be located adjacent to the text "Invoice number:".

Figure 3A:
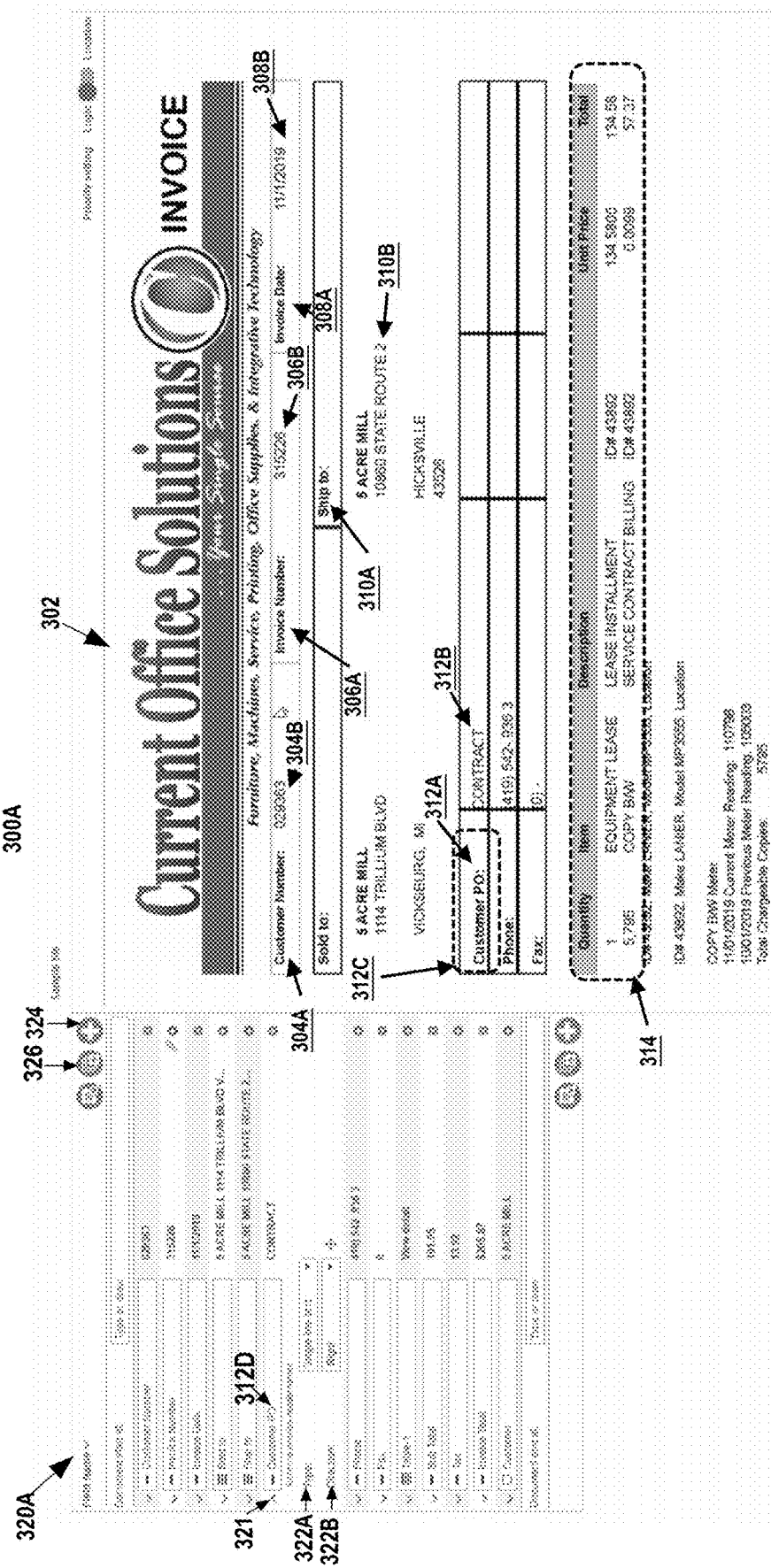
FIG. 3A depicts an example of the graphical user interface displaying a sample document of a sales invoice, according to an embodiment of the invention.

FIG. 3A depicts an example of the graphical user interface displaying a sample document of a sales invoice. Graphical user interface (GUI) 300A represents the graphical user interface displayed within the web browser 120 that allows users to generate one or more parsing rules and metadata mappings. GUI 300A comprises panel 302 and panel 320A. Panel 302 corresponds to a panel configured to display the sample document that includes a plurality of field labels and a plurality of field values. For example, field labels 304A, 306A, 308A, 310A, and 312A each represent potential field labels that may be identified and used to generate one or more parsing rules. Panel 320A is a panel that displays existing parsing rules for the sample document.

1. Receiving a First Set of Inputs

At block 204, process 200 receives a first set of inputs that include a selection of one or more field labels, of a plurality of field labels, within the sample document and indicators that identify one or more field values, of the plurality of field values, that correspond to the one or more field labels selected. In an embodiment, the document processing application 144 receives the first set of inputs from client device 114 via a data message that specifies the selection of one or more field labels and the indicators that identify the one or more field values that correspond to the one or more field labels.

In an embodiment, the selection of one or more field labels may represent a selection of an area within the sample document. For example referring to FIG. 3A, selection 312C represents input that selects or highlights an area that includes the field label 312A. In an embodiment, a user may initiate the selection of an area by clicking on either a create rule button 324 or a create multiple rules button 326. The create rule button 324 allows a user to subsequently select an area of interest, within the sample document, that contain a field label. For example, selecting the create rule button 324 allows the user to highlight an area represented by selection 312C. The create multiple rules button 326 allows a user to subsequently select an area of interest, within the sample document, that contains two or more field labels.

Upon receiving selection 312C, the client device 114 may send the selection to the document processing application 144. The document processing application 144 may communicate with the content manager 160 to send a text recognition request to the OCR engine 172 to analyze selection 312C to determine whether selection 312C contains text characters. OCR engine 172 may identify the text corresponding to field label 312A and send the text for field label 312A back to the document processing application 144. In embodiments where the selection of the area contains multiple field labels, the OCR engine 172 may provide the document processing application 144 with a set of identified texts corresponding to the multiple field labels.

The document processing application 144, in response to receiving the identified text from the OCR engine 172, may update panel 320A, of the GUI 300A, to display the identified text corresponding to the selected field labels. For example, panel 320A contains record 312D for field label 312A that includes the identified text of "Customer PO". In an embodiment, records within panel 320A have an associated dropdown caret 321, which when selected, displays additional configuration options for specifying the type of field label and an indicator to define the relative position of the corresponding field value for the specific field label. For example, the dropdown caret 321 for record 312D contains options 322A and 322B. Option 322A allows a user to specify whether the format of the corresponding field value is a single line of text, multiple lines of text, a table of values, or any other format. For example, the corresponding field value 312B contains the text "CONTRACT" which is represented on a single line of text. An example of a field value that is represented by multiple lines of text is field value 310B, which contains an address displayed on four lines of text. An example of a field value that is represented by a table of values is field value 314, which contains an inventory table that includes quantities of items, an item name, description, unit price, and total cost.

In an embodiment, option 322B represents a dropdown box containing available indicators to indicate the relative position of the field value with respect to the field label. The relative positions may include, but are not limited to, above, below, right, or left. For example, a user may select the relative position of "Right" to indicate that the field value 312B is located to the right of field label 312A. If the field value, such as field value 310B, is located below the field label 310A, then the user would select the "Below" option from the dropdown box in option corresponding to the record for field label 310A.

In an embodiment, the GUI 300A may receive additional input that specifies a particular field value as a primary key. For example, a user may select the field value 306B which represents an invoice number, within panel 320A, and designate the particular field value as a primary key using either a dropdown caret, a checkbox, or any other GUI input that may be displayed within panel 320A. By designating the invoice number (field value 306B) as a primary key, the parsing engine 174 may, when processing a batch of multiple documents, use the invoice number to determine how to identify which scanned pages belong to specific documents within the batch.

2. Generating Parsing Rules

In an embodiment, upon providing input that specifies the relative positions of corresponding field values for the field labels displayed in panel 320A, the client device 114 sends the provided input, which includes relationships between each of the one or more field labels and their corresponding field values, to the document processing application 144. The document processing application 144 receives the input and communicates with the content manager 160. At block 206, process 200 generates one or more parsing rules that define one or more field label-to-field value relationships based on the one or more field values and their corresponding field labels. In an embodiment, the content manager 160 generates the one or more parsing rules and stores the one or more parsing rules as parsing rule data 182 within memory of the document processing cloud system 130.

Figure 3B:
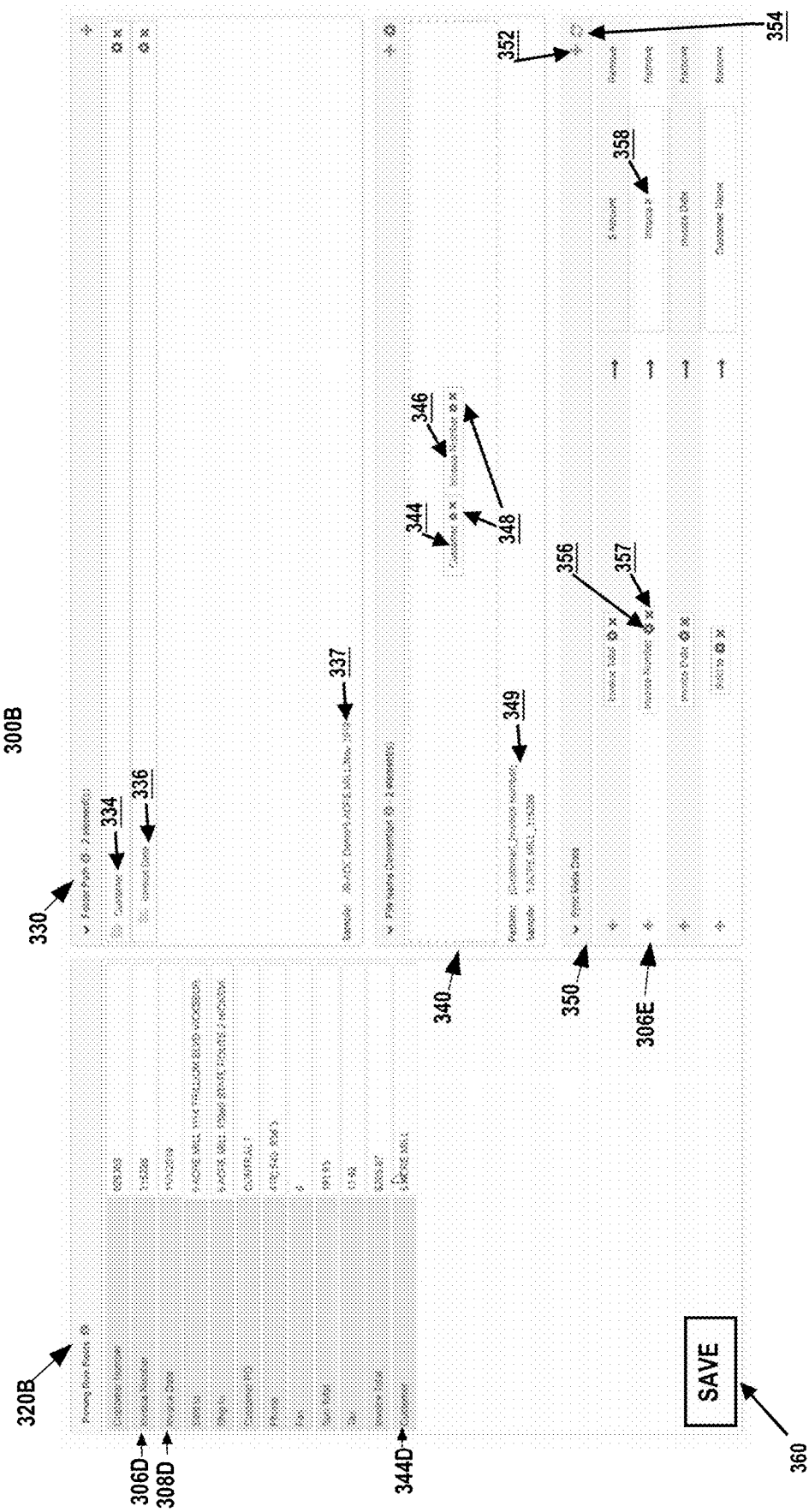
FIG. 3B depicts an example graphical user interface for configuring metadata mapping rules for documents, according to an embodiment of the invention.

Upon generating the one or more parsing rules, the document processing application 144 may generate and send an updated graphical user interface to the web browser 120 on client device 114. FIG. 3B depicts an example graphical user interface for configuring metadata mapping rules for documents. GUI 300B represents the graphical user interface displayed within the web browser 120. GUI 300B comprises panel 320B, panel 330, panel 340, and panel 350. Panel 320B is a panel that displays the generated parsing rules. Panel 330 displays routing rules for routing specific documents to destination folders within the third party storage system 190. Panel 340 displays filename generation rules for naming electronic documents scanned by input device 112 and processed by document processing cloud system 130. Panel 350 displays metadata mapping rules to generate metadata to be associated with processed documents.

3. Receiving a Second Set of Inputs

At block 208, process 200 receives a second set of inputs that include a selection of a subset of the one or more parsing rules to generate metadata mapping that maps a subset of the one or more field values, corresponding to the subset of the one or more parsing rules, to one or more display labels provided by the third party storage system 190. In an embodiment, the document processing application 144 receives the second set of inputs from client device 114 via a data message that specifies one or more metadata mapping rules to be associated with each document processed and routed using the one or more parsing rules specified.

In an embodiment, the second set of inputs may include input actions of selecting and dragging a parsing rule from panel 320B to panel 350 to generate a new metadata mapping rule. For example, if a user performs a select-and-drag action on record 306D, which is the parsing rule for field value 306B (invoice number), by selecting and dragging record 306D from panel 320B to panel 350, then GUI 300B may display a metadata mapping record 306E. The metadata mapping record 306E may represent a mapping between the field value 306B and a display label 358. The display label 358 represents the column header that will be displayed within a graphical user interface provided by the third party storage system 190. In this example, display label 358 is represented as "Invoice #".

In an embodiment, the display labels are retrieved from the third party storage service 190 by the communication engine 178. For example, if a user selects the sync button 354, the document processing application 144 receives the input and requests that the communication engine 178 retrieve a current set of display labels from the third party storage service 190. The communication engine 178 connects to the third party storage service 190 and retrieves the current set of display labels using one or more method calls from API provided by the third party storage system 190. In an embodiment, the communication engine 178 uses access credentials of the user to connect to and retrieve display labels from the third party storage service 190. Additionally, the third party storage service 190 may be configured to either prompt for or disable user authentication when syncing display labels.

Upon receiving the display labels, the communication engine provides the current set of display labels to the document processing application 144 and the document processing application 144 updates the display labels within panel 350. Users may log into the third party storage system 190 graphical user interface and create or update various display labels to be used for displaying metadata mappings. If users update the display labels within the third party storage system 190 graphical user interface, then the users may display their updates within GUI 300B by selecting the sync button 354. In another embodiment, the GUI 300B may be configured to allow users to manually enter the text for the display label.

In an embodiment, a field value associated with a metadata mapping may be further formatted by selecting the option button 356. The option button 356 allows a user to modify the format of the field value to be displayed. For example, if the field value for a metadata mapping includes a date format, such as MM-DD-YY, then a user may modify the date format of the field value by selecting the option button 356 and specifying a new date format, such as YYYY-MM-DD, within a popup window or other window displayed within GUI 300B. If a user wishes to remove the field value associated with a displayed metadata mapping, then the user may select remove button 357, which is represented by an "X". Selecting the remove button 357 removes the field value from the metadata mapping record and allows a user to select and drag another field value into panel 350.

In another embodiment, a user may create a new metadata mapping by selecting the new mapping button 352 within panel 350. The new mapping button 352 may cause the GUI 300B to display a popup window or that prompts the user to select a parsing rule record from panel 320B.

In an embodiment, the document processing application 144 may receive a third set of inputs from client device 114 via a data message that specifies a document naming convention for documents that are processed by the document processing cloud system 130 using the specified parsing rules displayed in panel 320B. For example, documents that are scanned, processed, and stored within the third party storage system 190 may be given a specific filename based upon one or more field values specified in the one or more parsing rules displayed in panel 320B. The third set of inputs may include one of more select-and-drag actions that select a record representing a parsing rule from panel 320B and drags the record into panel 340. For example, a first select-and-drag action performed may be selecting record 344D, which represents a parsing rule for a customer name field value, and dragging record 344D to panel 340. By dragging record 344D into panel 340, a rule is displayed that names the scanned and processed documents based on their customer name field value. If a user performs a second select-and-drag action by selecting record 306D, which is the parsing rule for field value 306B (invoice number), from panel 320B to panel 340, then GUI 300B may append the field value 306B to the customer name field value. This is depicted in panel 340 with object 344, which represents the customer name field value, and object 346, which represents field value 306B. A user may modify the format of either field value or delete either field value by selecting the gear icon or the X icon represented by icons 348. Sample output 349, within panel 340, displays a preview of the filename pattern and the sample filename output based upon the selected field values.

In an embodiment, the document processing application 144 may receive a fourth set of inputs from client device 114 via a data message that specifies a folder structure for routing and storing processed documents within the third party storage system 190. The folder structure rules may be based on one or more field values from the one or more parsing rules displayed in panel 320B. The fourth set of inputs may include one of more select-and-drag actions that select a record representing a parsing rule from panel 320B and drags the record into panel 330. For example, a select-and-drag action performed may be selecting record 344D, which represents a parsing rule for a customer name field value, and dragging record 344D to panel 330. This would display a rule to create a directory based on the customer name field value. If a user performs a subsequent select-and-drag action by selecting record 308D, which is the parsing rule for field value 308B (invoice date), from panel 320B to panel 330, then GUI 300B may display a subdirectory under the first directory displayed. For instance, if the first directory displayed is for generating a customer name directory, then the subfolder rule would generate subfolders within the customer name directory for each date specified within each invoice document processed. Sample output 337, within panel 330, displays a preview of the folder structure and directory routing path based upon the selected field values dragged into panel 330. For example, sample output shows a directory routing path of "/R-ADC Demo/5 ACRE MILL/Nov-2018", where the "R-ADC" is a base directory configured for a specific user, the "5 ACRE MILL" is the field value sample of the customer name specified within panel 320, and the "Nov-2018" is a field value sample of the invoice date specified within panel 320.

In an embodiment, GUI 300B may be configured to send the updated metadata mapping rules to the document processing application 144 when the user selects the save button 360. In another embodiment, GUI 300B may be configured to send the updated metadata mapping rules to the document processing application 144 when the user selects the sync button 354 within panel 350. In yet other embodiments, GUI 300B may be configured to send any updates to the document processing application 144 periodically. In additional embodiments, updated document naming conventions and/or updated folder structures may be sent to the document processing application 144 when the metadata mapping rules are sent to the document processing application 144, such as after selection of the save button 360, selecting the sync button 354, or periodically.

4. Associating the Metadata Mapping to a Document Library that Manages Views of the Destination Folder At block 210, process 200 associates the metadata mapping to a document library that manages views of the destination folder such that the one or more parsing rules and the metadata mapping are applied to each document routed to the destination folder. In an embodiment, the document processing application 144 receives the second set of inputs that include the metadata mapping and sends the metadata mapping to the content manager 160. The content manager 160 generates and stores the metadata mapping rules as metadata mapping data 188 within memory of the document processing cloud system 130.

In an embodiment, the document library may represent a set of destination folders and subfolders defined within the file management system 192 of the third party storage service 190. The document library may be used to define preferences for the set of destination folders and subfolders that belong to the document library. For example, metadata mapping associations made to the document library would be applied to each of the folders within the document library. Associating metadata mappings at a document library level has the added benefit of users avoiding the steps of making changes to each destination folder when metadata mapping rules change.

B. Processing and Routing Scanned Documents to Destination Folders in an External Storage Service In an embodiment, the arrangement 100 may be used to process a batch of scanned documents generating associated metadata for identified field values of interest and routing the scanned documents to destination folders on an external storage service for storage. The arrangement 100 may use parsing rules to identify one or more field labels and field values within one or more scanned documents. Metadata mapping rules, derived from the parsing rules, may be used to generate associated metadata mappings for each document scanned.

FIG. 4 is a flow diagram that depicts an approach for generating metadata based on identified field values and associating the generated metadata to scanned documents that are stored within a destination folder on a third party storage service 190. Process 400 may be performed by a single program or multiple programs. The operations of the process as shown in FIG. 4 may be implemented using processor executable instructions that are stored in computer memory. For the purposes of clarity, process 400 is described in terms of a single entity.

At block 402, process 400 maintains one or more parsing rules that define how to identify one or more field labels and one or more corresponding field values within one or more documents, and one or more metadata mappings that map associations between one or more display labels and the one or more field values. In an embodiment, the document processing cloud system 130 maintains, within memory, parsing rule data 182 corresponding to the one or more parsing rules and metadata mapping data 188 corresponding to the one or more metadata mapping.

In another embodiment, the document processing cloud system 130 additionally maintains directory structure data 184 that contains rules defining directory structures for destination folders located in the third party storage service 190. For example, the directory structure data 184 may specify the destination folder path for storing specific scanned documents, where the folder path is based upon field values from one or more parsing rules.

In yet another embodiment, the document processing cloud system 130 additionally maintains filename structure data 186 that contains rules defining syntax for naming files of scanned documents to be stored in destination folders located in the third party storage service 190. For example, the filename structure data 186 may specify the format of filenames for specific types of scanned documents based upon field values from one or more parsing rules.

At block 404, process 400 receives a batch of two or more scanned documents for processing. In an embodiment, the input device 112 may scan a batch of multiple documents. The batch of multiple documents may contain different types of documents, such as sales invoices, customer contracts, instruction manuals, or any other document type. Document types are not limited to distinct type of documents that have different formats. The different types of documents may also include documents that contain unique attribute values that may cause each of the documents to be routed to different destination folders. For example, a first type of document may be a sales invoice for customer A and a second type of document may be a sales invoice for customer B, where each of the sales invoices for each of the customers are routed to different destination folders.

Upon scanning the batch of documents, the input device 112 sends a data message to the document processing application 144. The data message may contain a single file that represents the scanned batch of documents. The document processing application 144 routes the data message to the content manager 160 to process the batch of scanned documents. In an embodiment, the content manager 160 uses the parsing engine 174 to identify a particular parsing rule that contains a particular field value that has been designated as a primary key. The primary key serves as a unique identifier for identifying different scanned documents. For example, if the batch of scanned documents contains multiple sales invoices for multiple different dates and different customers, then the invoice number may be used to identify each scanned page that makes up a single sales invoice for a customer, provided that the invoice number is on each scanned page of the batch. The content manager 160, upon determining the primary key from the particular parsing rule, may request that the OCR engine 172 scan each page within the batch to determine which pages belong to individual documents based upon the presence of the primary key on each page. Upon determining which pages belong to which document, the document processing cloud system 130 may process each of the documents.

At decision diamond 406, process 400 determines whether there are remaining documents in the batch to be processed. In an embodiment, the content manager 160 may iterate through each of the documents in the batch to identify relevant field labels and field values using the one or more parsing rules. If there are remaining documents to be processed, then process 400 proceeds to block 408 to use the one or more parsing rules to identify field labels and field values within the remaining documents. If however, there are no remaining documents to be processed, the process 400 proceeds to block 414 to send the scanned documents and their associated metadata to the third party storage service 190.

At block 408, process 400 selects one of the remaining documents to be processed and uses the one or more parsing rules to identify a subset of field labels and a subset of corresponding field values. In an embodiment, the content manager 160 selects one of the remaining documents and retrieves the one or more parsing rules from the parsing rule data 182 that correspond to the document type of the selected document. The content manager 160 sends a request the parsing engine 174, that includes the selected document and the retrieves one or more parsing rules, to identify the subset of field labels and the subset of corresponding field values.

In an embodiment, the parsing engine 174 uses the OCR engine 172 to identify a portion of text that matches a field label defined by one of the parsing rules. For example, if the parsing rule specifies a field label as "Customer Number" then the OCR engine 172 locates an area within the document that contains text that matches "Customer Number". Upon locating the area in the document that contains the matching text, the parsing engine 174 determines the location of the corresponding field value. Each parsing rule contains relative position information that defines the position of the corresponding field value relative to the location of the area that contains the identified field label. The relative position information within the parsing rule may specify that the corresponding field label is either to the right, the left, above, or below the location of the field label. The parsing engine 174 may then search an area of the document corresponding to the relative position to identify the corresponding field value within the document. Upon identifying the field value corresponding to the field label, the parsing engine 174 repeats the process to identify field values for each field label defined in the one or more parsing rules.

At block 410, process 400 uses the one or more metadata mappings to generate metadata comprising the subset of field values mapped to a subset of display labels of one or more display labels. In an embodiment, the content manager 160 retrieves the relevant metadata mappings from the metadata mapping data 188. The content manager 160 requests the data generator 176 to generate metadata for the selected document based on the identified field label and field value pairs and the metadata mappings.

At block 412, process 400 associates the metadata to the selected document. In an embodiment, the data generator 176 may associate the generated metadata to an electronic copy of the selected document.

In an embodiment, the data generator 176 may also determine the destination folder of the selected document using directory structure information stored within the directory structure data 184. For example, the data generator 176 may retrieve destination folder generation rules that define a folder path and directory structure for where the selected document is to be stored within the third party storage service 190. For example, if the destination folder generation rules specify the folder path as being "/<Customer name>/<invoice date-Mon-YYYY>" then the data generator 176 would determine the folder path of the selected document to be "/5 ACRE MILL/Nov-2019/" where the customer name is "5 ACRE MILL" and the invoice date is "Nov. 2019". The data generator 176 associates the determined folder path with the selected document so that when the selected document is sent to the third party storage service 190, the selected document will be routed to the destination folder specified by the folder path.

In an embodiment, the data generator 176 may also determine a filename for the selected document using a document naming rule stored in the filename structure data 186. For example, the data generator 176 may retrieve document naming rules that define syntax for naming the selected file to be stored within the third party storage service 190. For example, if the document naming rule specifies that the filename format is "[Customer] [Invoice Number]" then the data generator 176 would determine the filename of the selected document to be "5 ACRE MILL 315226" where the customer name is "5 ACRE MILL" and the invoice number is "315226". The data generator 176 associates the determined filename with the selected document so that when the selected document is sent to the third party storage service 190, the selected document will be stored within the destination folder using the determined filename.

Upon associating the metadata to the selected document and optionally associating the determined folder path and filename to the selected document, process 400 proceeds back to decision diamond 406 to determine whether there are remaining documents in the batch to be processed. If there are remaining documents to be processed, then process 400 repeats blocks 408-412 on the remaining documents. If however, there are no remaining documents to be processed then process 400 proceeds to block 414. At block 414, process 400 sends the two or more documents and the metadata associated with each of the two or more documents to the third party storage service 190. In an embodiment, the communication engine 178 sends a data message containing image files corresponding to the two or more documents, as well as the generated metadata to the third party storage service 190. In an embodiment, if the data generator 176 associated either the folder path, filename, or both with each of the two or more documents then the data message would also include the folder path, filename, or both.

C. Third Party Storage Service

In an embodiment, the third party storage service 190 may receive the data message and the storage service 194 may route each file corresponding the documents to their appropriate destination folder defined by their associated folder path and may store each of the files using their associated filenames. Storage of each of the files may also include the associated metadata.

In an embodiment, if folders within the folder path do not yet exist in the third party storage service 190 then the file management system 192 may generate any necessary folders and subfolders in order to save the received files to their appropriate destination folders.

Figure 5:
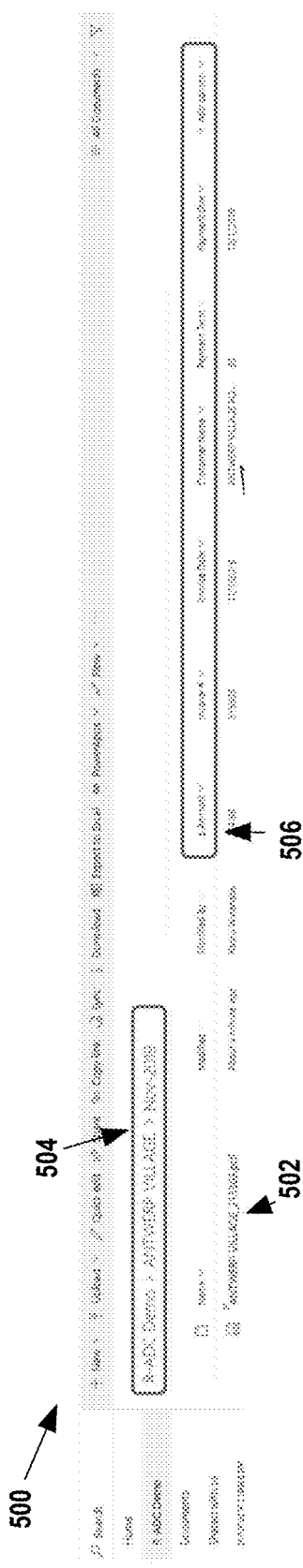
FIG. 5 depicts an example graphical user interface for displaying files stored in the third party storage service, according to an embodiment of the invention.

In an embodiment, client device 114 may establish a connection to the third party storage service 190 to view the stored documents. For example, the file management system 192 may generate a graphical user interface for viewing, sorting, filtering, and searching on files stored in various destination folders based upon the associated metadata. FIG. 5 depicts an example graphical user interface for displaying files stored in the third party storage service. GUI 500 represents the graphical user interface, generated by the file management system 192. File 502 represents a stored document. The filename of the file 502 is "ANTWERP VILLAGE_315303.pdf" which has a filename format corresponding to "[Customer] [Invoice Number]", where "ANTWERP VILLAGE" is the customer name and "315303" is the invoice number. Destination folder path 504 indicates the current folder path for the displayed folder as "R-ADC Demo>ANTWERP VILLAGE>NOV-2019", which corresponds to the folder path "User home folder/<Customer name>/<invoice date-Mon-YYYY>" where the user home folder is "R-ADC Demo", the <Customer name> is "ANTWERP VILLAGE" and the >/<invoice date-Mon-YYYY> is "NOV-2019". Metadata columns 506 contain column names corresponding to the display names from the associated metadata. The corresponding data values would be displayed in the same row as the filename. Each of the columns in metadata columns 506 may be used to sort, filter, and search against. This enables users with greater flexibility to find specific files based upon searchable metadata.

IV. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
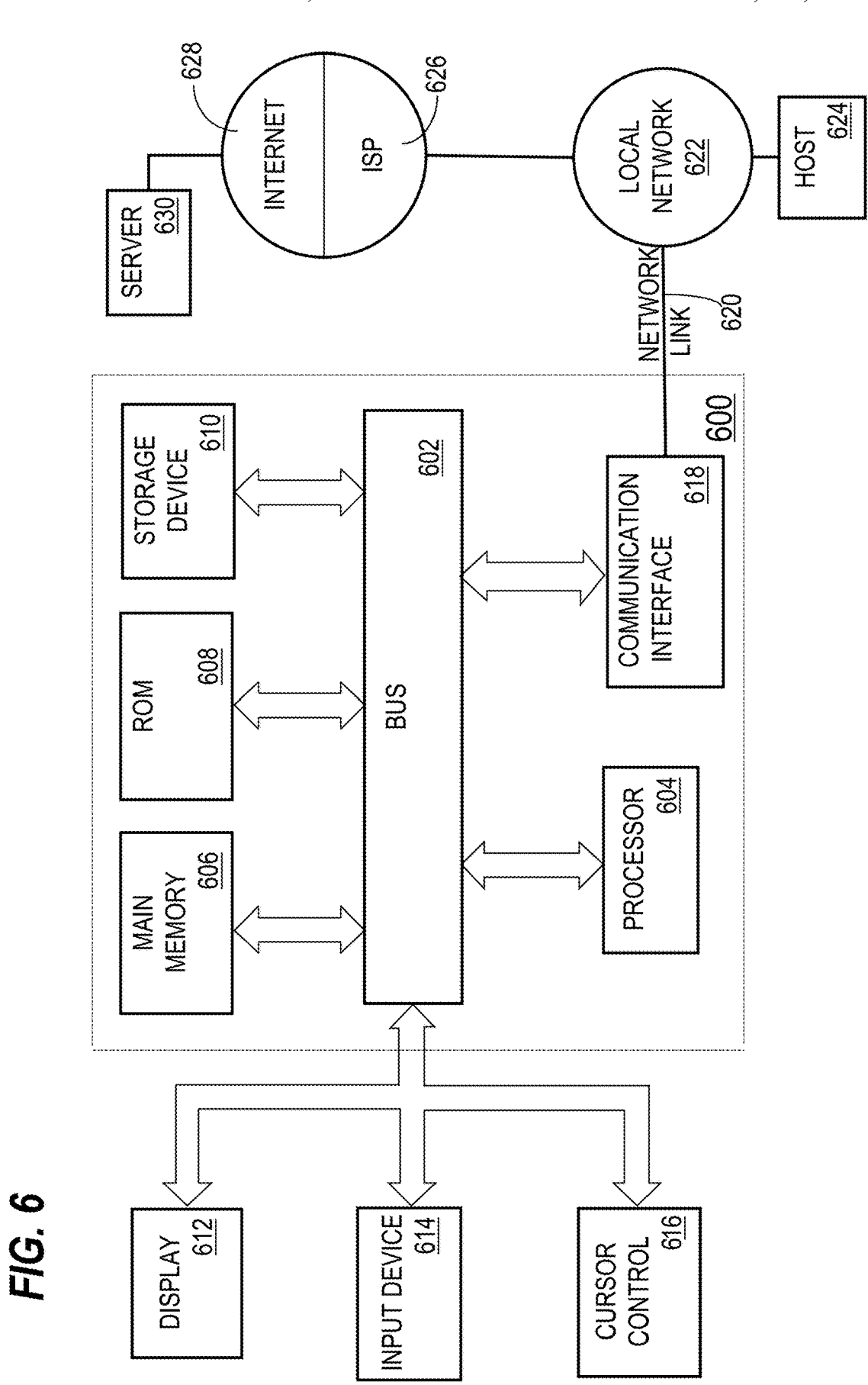
FIG. 6 is a block diagram of a computer system on which embodiments of the invention may be implemented.

FIG. 6 is a block diagram that depicts an example computer system 600 upon which embodiments of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by the one or more processors, cause:
      causing a graphical user interface to display a sample document containing a plurality field labels and a corresponding plurality of field values, wherein the sample document represents a particular type of document to be routed to a destination folder;
      receiving a first set of inputs that include a selection of one or more field labels, of the plurality of field labels, and indicators that identify one or more field values, of the plurality of field values, that correspond to the one or more field labels selected;
      in response to receiving the first set of inputs, generating one or more parsing rules that define one or more field label-to-field value relationships, the one or more parsing rules are based on the one or more field labels and the one or more corresponding field values;
      receiving a second set of inputs that include a selection of a subset of the one or more parsing rules to generate one or more metadata mappings used by a document library to manage documents routed to the destination folder.

2. The apparatus of claim 1, wherein receiving the first set of inputs that include the selection of the one or more field labels of the plurality of field labels and the indicators that identify the one or more field values, of the plurality of field values, that correspond to the one or more field labels selected comprises further instructions which, when processed by the one or more processors, cause:
   receiving selection input, of the first set of inputs, that selects an area within the sample document containing the one or more field labels;
   causing the graphical user interface to display, within a first panel, each of the one or more field labels detected from the selection input; and
   for each particular field label of the one or more field labels, receiving a particular indicator, of the indicators, that specifies a relative position for a particular field value that corresponds to the particular field label.

3. The apparatus of claim 2, wherein the particular indicator indicates that the relative position of the particular field value as being located either to a right, left, above, or below the particular field label.

4. The apparatus of claim 1, wherein the second set of inputs comprise one or more select-and-drag actions on the subset of the one or more parsing rules to drag the subset of the one or more parsing rules into a first area of the graphical user interface designated for metadata mapping.

5. The apparatus of claim 1, the one or more memories store additional instructions which, when processed by the one or more processors, cause receiving a third set of inputs that includes one or more select-and-drag actions on a second subset of the one or more parsing rules to drag the second subset of the one or more parsing rules into a second area of the graphical user interface, which is designated for defining document naming conventions, to generate a document naming structure for documents generated from a scan of one or more physical documents.

6. The apparatus of claim 1, the one or more memories store additional instructions which, when processed by the one or more processors, cause receiving a fourth input that is a select-and-drag action on a parsing rule from the one or more parsing rules to drag the parsing rule into to a third area of the graphical user interface, which is designated for defining a folder structure, to generate a folder structure that specifies routing processed documents to a location corresponding to the destination folder.

7. The apparatus of claim 6, the one or more memories store additional instructions which, when processed by the one or more processors, cause:
   receiving a fifth input that specifies a naming convention for the destination folder based upon syntax of a field value associated with the parsing rule selected; and
   updating the naming convention of the destination folder based on the fifth input.

8. One or more non-transitory computer-readable media storing instructions which, when processed by one or more processors, cause:
   causing a graphical user interface to display a sample document containing a plurality field labels and a corresponding plurality of field values, wherein the sample document represents a particular type of document to be routed to a destination folder;
   receiving a first set of inputs that include a selection of one or more field labels, of the plurality of field labels, and indicators that identify one or more field values, of the plurality of field values, that correspond to the one or more field labels selected;
   in response to receiving the first set of inputs, generating one or more parsing rules that define one or more field label-to-field value relationships, the one or more parsing rules are based on the one or more field labels and the one or more corresponding field values;
   receiving a second set of inputs that include a selection of a subset of the one or more parsing rules to generate one or more metadata mappings used by a document library to documents routed to the destination folder.

9. The one or more non-transitory computer-readable media of claim 8, wherein receiving the first set of inputs that include the selection of the one or more field labels of the plurality of field labels and the indicators that identify the one or more field values, of the plurality of field values, that correspond to the one or more field labels selected, comprises:
receiving selection input, of the first set of inputs, that selects an area within the sample document containing the one or more field labels;
causing the graphical user interface to display, within a first panel, each of the one or more field labels detected from the selection input; and
for each particular field label of the one or more field labels, receiving a particular indicator, of the indicators, that specifies a relative position for a particular field value that corresponds to the particular field label.

10. The one or more non-transitory computer-readable media of claim 9, wherein the particular indicator indicates that the relative position of the particular field value as being located either to a right, left, above, or below the particular field label.

11. The one or more non-transitory computer-readable media of claim 8, wherein the second set of inputs comprise one or more select-and-drag actions on the subset of the one or more parsing rules to drag the subset of the one or more parsing rules into a first area of the graphical user interface designated for metadata mapping.

12. The one or more non-transitory computer-readable media of claim 8, further comprising additional instructions which, when processed by the one or more processors, cause receiving a third set of inputs that includes one or more select-and-drag actions on a second subset of the one or more parsing rules to drag the second subset of the one or more parsing rules into a second area of the graphical user interface, which is designated for defining document naming conventions, to generate a document naming structure for documents generated from a scan of one or more physical documents.

13. The one or more non-transitory computer-readable media of claim 8, further comprising additional instructions which, when processed by the one or more processors, cause receiving a fourth input that is a select-and-drag action on a parsing rule from the one or more parsing rules to drag the parsing rule into to a third area of the graphical user interface, which is designated for defining a folder structure, to generate a folder structure that specifies routing processed documents to a location corresponding to the destination folder.

14. The one or more non-transitory computer-readable media of claim 13, further comprising additional instructions which, when processed by the one or more processors, cause:
receiving a fifth input that specifies a naming convention for the destination folder based upon syntax of a field value associated with the parsing rule selected; and
updating the naming convention of the destination folder based on the fifth input.

15. A method comprising:
causing a graphical user interface to display a sample document containing a plurality field labels and a corresponding plurality of field values, wherein the sample document represents a particular type of document to be routed to a destination folder;
receiving a first set of inputs that include a selection of one or more field labels, of the plurality of field labels, and indicators that identify one or more field values, of the plurality of field values, that correspond to the one or more field labels selected;
in response to receiving the first set of inputs, generating one or more parsing rules that define one or more field label-to-field value relationships, the one or more parsing rules are based on the one or more field labels and the one or more corresponding field values;
receiving a second set of inputs that include a selection of a subset of the one or more parsing rules to generate one or more metadata mappings used by a document library to manage documents routed to the destination folder.

16. The method of claim 15, wherein receiving the first set of inputs that include the selection of the one or more field labels of the plurality of field labels and the indicators that identify the one or more field values, of the plurality of field values, that correspond to the one or more field labels selected, comprises:
receiving selection input, of the first set of inputs, that selects an area within the sample document containing the one or more field labels;
causing the graphical user interface to display, within a first panel, each of the one or more field labels detected from the selection input; and
for each particular field label of the one or more field labels, receiving a particular indicator, of the indicators, that specifies a relative position for a particular field value that corresponds to the particular field label.

17. The method of claim 16, wherein the particular indicator indicates that the relative position of the particular field value as being located either to a right, left, above, or below the particular field label.

18. The method of claim 15, wherein the second set of inputs comprise one or more select-and-drag actions on the subset of the one or more parsing rules to drag the subset of the one or more parsing rules into a first area of the graphical user interface designated for metadata mapping.

19. The method of claim 15, further comprising receiving a third set of inputs that includes one or more select-and-drag actions on a second subset of the one or more parsing rules to drag the second subset of the one or more parsing rules into a second area of the graphical user interface, which is designated for defining document naming conventions, to generate a document naming structure for documents generated from a scan of one or more physical documents.

20. The method of claim 15, further comprising receiving a fourth input that is a select-and-drag action on a parsing rule from the one or more parsing rules to drag the parsing rule into to a third area of the graphical user interface, which is designated for defining a folder structure, to generate a folder structure that specifies routing processed documents to a location corresponding to the destination folder.

* * * * *

UNITED STATES PATENT AND TRADEMARK OFFICE
CERTIFICATE OF CORRECTION

PATENT NO. : 11,182,439 B2
APPLICATION NO. : 16/805663
DATED : November 23, 2021
INVENTOR(S) : Kaoru Watanabe Page 1 of 1

It is certified that error appears in the above-identified patent and that said Letters Patent is hereby corrected as shown below:

In the Claims

Column 21, Claim 8, Line 2, delete "library to documents" and insert --library to manage documents--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*